W. F. VIA.
AUTOMOBILE BRAKE.
APPLICATION FILED JAN. 30, 1913.
1,088,248.
Patented Feb. 24, 1914.
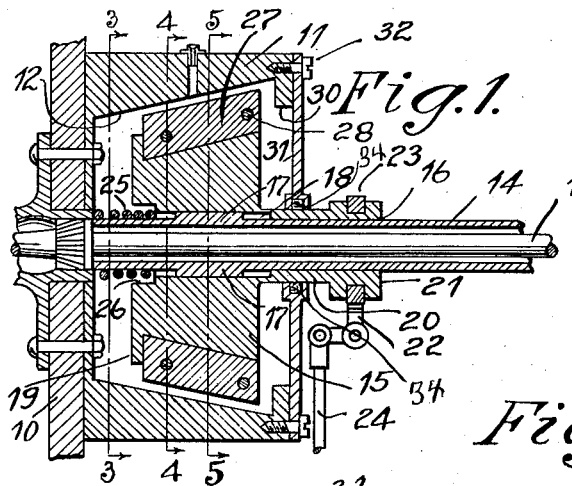
Fig. 1.
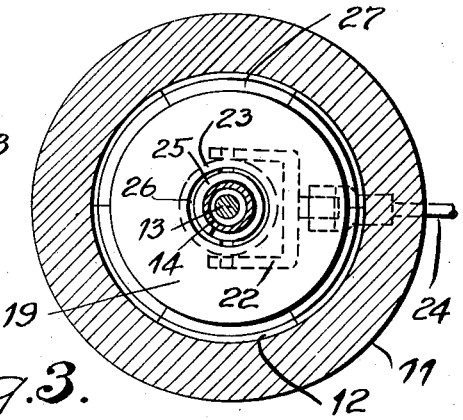
Fig. 3.
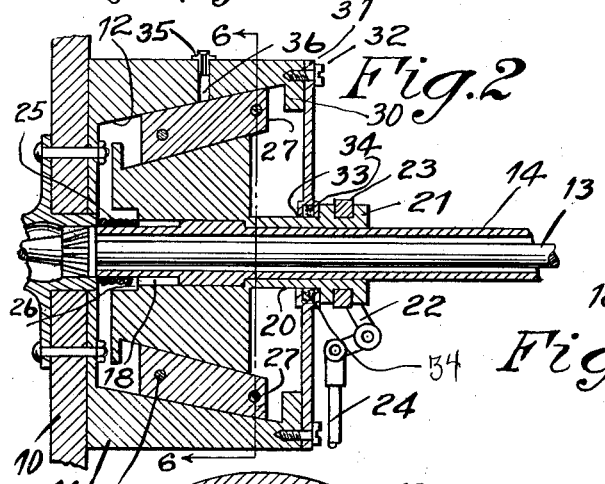
Fig. 2.
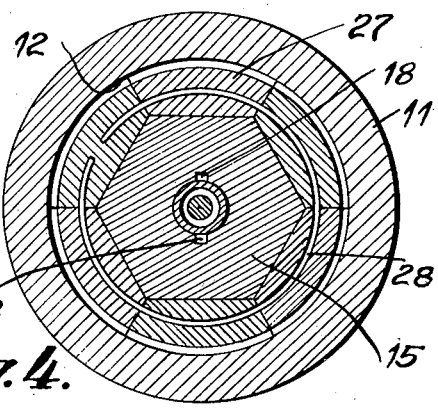
Fig. 4.
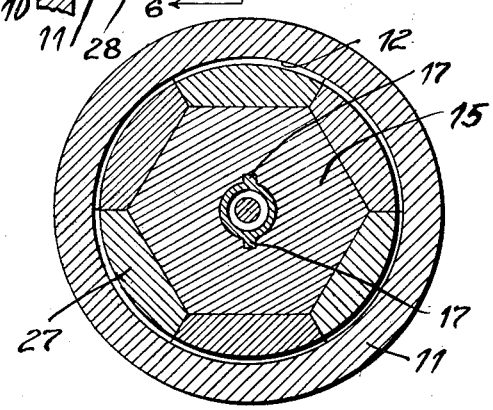
Fig. 5.
Fig. 6.
Witnesses
M. S. Watson
Francis Boyle
Inventor
W. F. Via
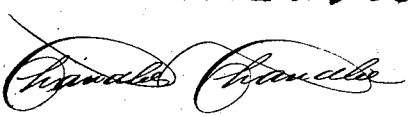
By
Attorneys

UNITED STATES PATENT OFFICE.

WILLIAM F. VIA, OF HUNTINGTON, WEST VIRGINIA.

AUTOMOBILE-BRAKE.

1,088,248.

Specification of Letters Patent. Patented Feb. 24, 1914.

Application filed January 30, 1913. Serial No. 745,218.

*To all whom it may concern:*

Be it known that I, WILLIAM F. VIA, a citizen of the United States, residing at Huntington, in the county of Cabell, State of West Virginia, have invented certain new and useful Improvements in Automobile-Brakes; and I do hereby declare the following to be a full, clear, and exact description of the invention, such as will enable others skilled in the art to which it appertains to make and use the same.

This invention relates to automobile brakes and has for an object to provide a brake formed of a few number of extremely simple and durable parts which will not easily get out of order and will not require attention when in use.

With the above objects in view the invention consists of certain novel details of construction and combination of parts hereinafter fully described and claimed, it being understood that various modifications may be made in the minor details of construction within the scope of the appended claims.

In the accompanying drawing illustrating this invention:—Figure 1 is a longitudinal section with the brake in released position. Fig. 2 is a longitudinal section with the brake in operative position. Fig. 3 is a cross section on line 3—3 Fig. 1. Fig. 4 is a cross section on line 4—4 Fig. 1. Fig. 5 is a cross section on line 5—5 Fig. 1. Fig. 6 is a cross section on line 6—6 Fig. 2.

Referring now to the drawing in which like characters of reference designate similar parts, 10 designates an automobile wheel to one side of which is fixed a cylindrical brake casing 11 having a conical bore 12. The automobile axle 13 extends axially through the casing and wheel, and a sleeve 14 surrounds the axle and extends through the casing up to the hub of the wheel, the axle as usual rotating within the sleeve which is stationary.

Slidably mounted on the sleeve is a hexagonal cone 15 having an axial bore 16 which receives the sleeve, there being a pair of keys 17 at diametrically opposite points in the sleeve projecting into slots 18 in the cone and preventing rotation of the cone while permitting of the same sliding freely longitudinally of the sleeve. The cone is formed at the smaller end with a peripheral collar 19 which holds the brake shoes in place as will presently be more fully described, and is formed at the larger end with an axial boss 20 which projects outwardly beyond the brake casing 11 and is terminally equipped with an integral grooved collar 21. A bell crank lever 22 is pivoted at the elbow to the automobile frame in any preferred manner one leg of the lever being connected to a ring 23 which surrounds the groove in the collar 21, the other leg of the lever being connected to an operating rod 24. Actuation of the rod serves to move the cone inwardly against the pressure of a helical spring 25 which surrounds the sleeve and fits into a socket 26 formed in the small end of the cone, and further bears terminally against the inner wall of the socket and against the hub of the wheel.

Surrounding the cone is a frusto-conical hexagonal brake shoe formed of six tapered sections 27 which extend side by side and fit corresponding faces of the hexagonal cone. All of the sections are flexibly connected together near the ends by means of spaced split spring rings 28 which are engaged through suitable openings 29 formed in the sections, these rings serving to hold the sections snugly together upon the hexagonal cone 15 but permitting of the sections moving apart relatively to each other when the cone is slid longitudinally through the sections. When the cone is slid inwardly by means of the operating rod the sections of the shoe are moved outwardly radially and also outwardly from each other and snugly engage with the conical bore of the brake casing 11. Upon release of the operating rod the spring 25 returns the cone to released position whereupon the spring split rings 28 return the sections to released position, that is withdraw the sections from the brake casing and cause the sections to contract radially and again snugly fit the cone. The operative and released positions of the brake shoe sections are best shown in Figs. 4 and 6. The sections bear terminally against the retaining collar 19 of the hexagonal cone 15 and are thus held against escape from the cone.

For preventing the access of dust and other foreign matter to the interior of the brake casing 11, the latter is provided with a flange 30 to which a cover 31 is bolted as shown at 32, the cover having a central opening 33 in which is arranged a stuffing box 34 that surrounds the boss 20 of the hexagonal cone 15. An oil cup 35 is mounted on the brake casing 11 and an oil duct 36 leads from the cup and opens through the bore of the casing to facilitate the brake shoe sections being lubricated so that the most effective working of the brake may be assured without attention.

What is claimed, is:—

1. In a brake, a brake casing having a conical bore, a cone movable axially in said bore and having longitudinal flat faces, and a brake shoe comprising a plurality of tapered sections flexibly held together on corresponding flat faces of said cone.

2. In a brake, a brake casing having a conical bore, a cone movable axially in said bore and having longitudinal flat faces, a plurality of tapered brake shoe sections disposed side by side and fitting upon corresponding flat faces of said cone, and spaced contractile springs engaged through and flexibly holding said sections together.

In testimony whereof, I affix my signature, in the presence of two witnesses.

WILLIAM F. VIA.

Witnesses:
T. F. EAKMAN,
H. B. ROSS.